United States Patent

Kim

[11] Patent Number: 5,953,853
[45] Date of Patent: Sep. 21, 1999

[54] MOUSE AND RAT TRAP

[76] Inventor: Bok M. Kim, 37-15 72 St. #5, Jackson Heights, N.Y. 11372

[21] Appl. No.: 08/828,660

[22] Filed: Mar. 31, 1997

[51] Int. Cl.⁶ ............................ A10M 23/02; A01M 23/38
[52] U.S. Cl. .......................................... 43/98; 43/61; 43/73
[58] Field of Search .................................... 43/60, 61, 64, 43/73, 98

[56]  References Cited

U.S. PATENT DOCUMENTS

| 912,203 | 2/1909 | Swasey | 43/98 |
|---|---|---|---|
| 3,468,054 | 9/1969 | Levine | 43/98 |
| 4,062,142 | 12/1977 | Marotti | 43/61 |
| 4,138,796 | 2/1979 | Souza | 43/61 |
| 4,255,891 | 3/1981 | Chen | 43/64 |
| 4,553,349 | 11/1985 | Tsai | 43/73 |
| 4,669,216 | 6/1987 | Moss | 43/73 |
| 4,741,121 | 5/1988 | Pratscher et al. | 43/64 |
| 4,780,985 | 11/1988 | Coots | 43/98 |
| 4,835,900 | 6/1989 | Shifflett | 43/64 |
| 5,027,547 | 7/1991 | Livshin | 43/98 |

FOREIGN PATENT DOCUMENTS

| 618477 | 9/1935 | Germany | 43/98 |
|---|---|---|---|
| 8503201 | 8/1985 | WIPO | 43/73 |
| 092000671 | 1/1992 | WIPO | 43/98 |

Primary Examiner—Kurt Rowan

[57] ABSTRACT

A mouse and rat trap that can be used to trap and rapidly kill at least one mouse, rat, rodent, and the like in a humane way, can be used multiple times in heavily infested areas, is inexpensive, easy to operate, durable, and allows for sanitary disposal of a plurality of the trapped and dead mice, rats, rodents, and the like without contact to humans who are required to dispose of the dead mice, rats, rodents, and the like. The mouse and rat trap has at least one entrance for at least one mouse, rat, rodent, and the like to enter therethrough, a bait container for attracting mice, rats, rodents, and the like, and an activation sensor for detecting presence of the mice, rats, rodents, and the like having entered the mouse and rat trap; a moveable partition for pushing and entrapping the mouse, rat, rodent, and the like past the entrance to an electrocution platform. Further, the activation sensor for signalling the moveable partition drive means to commence pushing; means for reversably driving the moveable partition; further the moveable partition for pushing the mouse, rat, rodent, and the like into a holding container has an optional bag is provided for sanitary removal and disposal of the mice, rats, rodents, and the like. An activation switch for signalling the moveable partition to reverse drive motion and return to a resting starting position.

24 Claims, 4 Drawing Sheets

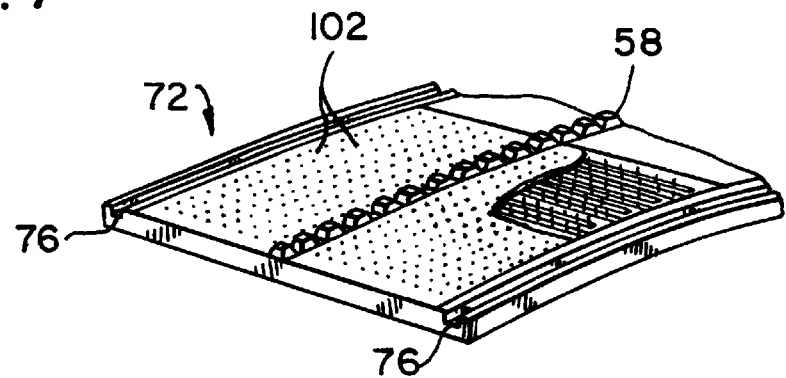
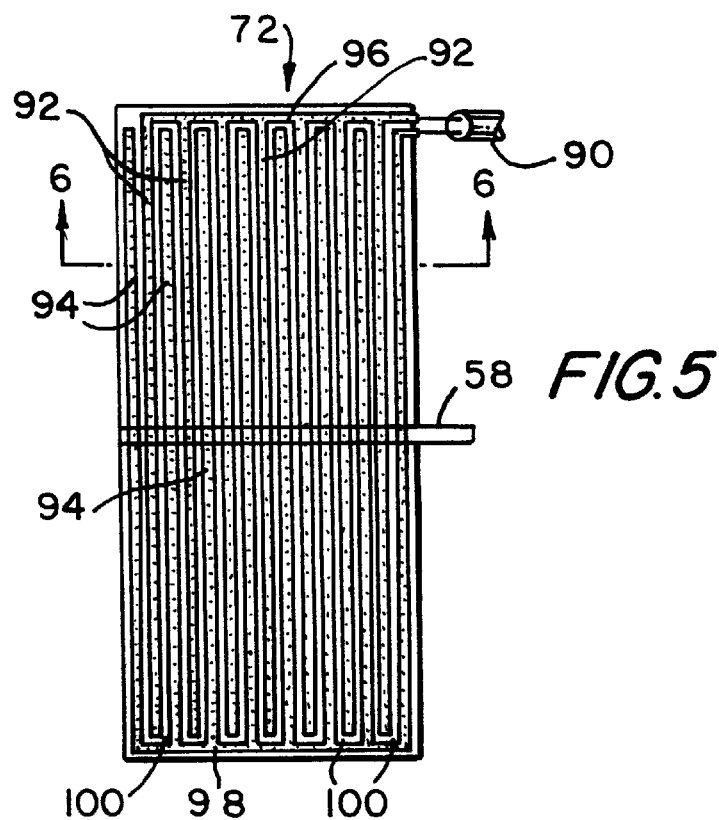
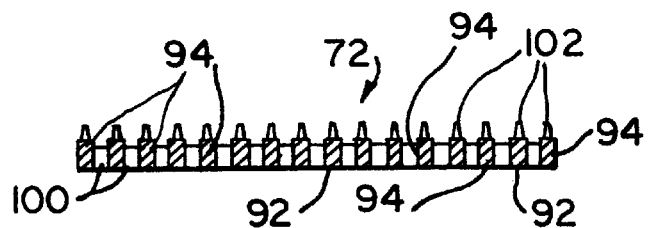

MOUSE AND RAT TRAP

BACKGROUND OF THE INVENTION

1. Field of the Invention

The present invention relates generally to animal traps and more particularly to traps for mice, rats, rodents, and the like.

2. Background Art

Mice and rats are destructive pests and vectors for a variety of diseases. Rats harbor and transmit a number of serious diseases, carrying fleas, lice, and ticks, and have been responsible for Bubonic Plague, known as the Black Death, which is usually transmitted to humans by fleas from rats. The first of the well known recurrent bubonic and pneumonic plagues beset Western Europe in 1348 A.D. and recurred until the 1730's, having catastrophic effects by wiping out what is estimated to be 50 per cent of the populations of that time. Female Norway Rats can breed and have four to seven litters per year, producing from eight to twelve young per litter. Rats damage structures, chew electrical wiring and cause electrical fires, eat, urinate on and deposit feces on human and animal food, and carry many diseases. Thousands of rat bites are reported each year in the U.S. alone, and many rat bites go unreported. Mice are also a significant nuisance and source of danger, and can invade a home or commercial establishment, seeking food, water, and warmth. Mice have also been responsible for electrical fires by chewing through electrical wires. In six months, one pair of mice can eat about four pounds of food and produce approximately 18,000 fecal droppings, contaminating and spreading disease to humans and animals with these droppings. Each mouse can contaminate ten times more food than it eats, and each pair of mice can produce as many as 200 offspring in four months. Because of the proliferation of both rats and mice, each is difficult to control.

Both rats and mice proliferate in large numbers rapidly, and because of the disease carrying characteristics of both mice and rats, there is a need for sanitary removal of each, obviating the need for human contact with both rats and mice. Once a home, warehouse, restaurant, hotel, supermarket, farm, or commercial establishment is infested with rats or mice, control of the population of such mice and rats becomes extremely difficult and dangerous to the human population.

There is a need for a mouse and rat trap that can be used to trap and rapidly kill at least one mouse, rat, rodent, and the like in a humane way, that can be used multiple times in heavily infested areas, is inexpensive, easy to operate, durable, and that allows for sanitary disposal of a plurality of the trapped and dead mice, rats, rodents, and the like without contact to humans who are required to dispose of the dead mice, rats, rodents, and the like.

Different mouse and rat traps have heretofore been known. However, none of these mouse traps and rat traps adequately satisfies the aforementioned needs.

Different rat traps and mouse traps have been disclosed.

U.S. Pat. No. 5,471,781 (Vine) discloses a trap for capturing mice or other rodents, including a main body having an entrance ramp leading thereinto. A bait container is positioned within the main body of the mouse trap to attract a mouse towards a pivotally mounted trap door. A holding compartment positioned beneath the trap door receives the mouse within a removable drawer. The drawer includes an insertable screen, which permits removal of the drawer and transport of the mouse to an exterior area for release thereof.

U.S. Pat. No. 4,566,218 (Kurosawa et al) discloses an apparatus for automatically trapping and processing rats, having a tube for delivering under suction a trapped rat together with a ball shaped carrier into a collection tube spaced from a rat entry opining in the tube. The trapped rat is killed by a carbon dioxide gas supplied in the collection tube, and placed in a bag shaped film which is fused and cut off. The dead rat contained in the bag is then discharged.

European Patent No. EP159634 (Kurosawa et al) also discloses an apparatus having several trapping tubes, each tube having entry openings for a rat in its side walls. All the trapping tubes are connected to a common conveying tube. A suction fan is used to produce air flow in the conveying tube and push a trapped rat into a processing section, where the trapped rat is asphyxiated and packed into a plastic bag for discharge into a container.

U.S. Pat. No. 5,511,339 (Pencheon) discloses a trap for rodents, such as mice, rats, and similar small animals, which consists of a cabinet having an upper entrance to allow the rodents to enter, and a lower chamber to retain the rodents. The trap resets itself, so that it may be used to trap more than one rodent in heavily infested areas.

U.S. Pat. No. 4,418,493 (Jordan) discloses an animal trap comprising a system of interconnected modular units including a gate, which is treadle operated by an entering animal to snap to a latch closed position from an open position adjacent the floor of the trap. The trap has a hermetically sealed capture module with a plastic bag liner, which may be disengaged from the system of interconnected modular units for disposal purposes.

U.S. Pat. No. 4,030,230 (Souza) discloses an animal trap, particularly a mouse trap, in combination with a package therefor, wherein the trap is normally urged into a collapsible container forming part of the package, such as a paper bag, by a resilient means in the form of a rubber band, with a limited stop means being provided to temporarily maintain the trap outside the container until an animal triggers the trap, at which time the impact causes the trap to jump the stop and be withdrawn into the container. The trap and the trapped animal are thus encased by the package and can be disposed of without contact by the user.

Japanese Patent No. JP0511345 (Assignee: (NIPQ) Dainippon Printing Co. Ltd.) discloses a rat trap with automatic discarding system, consisting of a laminate of nonwoven cloth and polyethylene film with adhesive to adherence to the rat and foldable means for disposal.

British Patent No. GB2252485 (Bailey) discloses an animal trap for trapping and killing a small animal having an integral bag for storage, a baseboard, a trigger, and a flexible bag container with an open front end portion and a closed rear end portion adapted to underlie at least part of the trap. An animal may enter the open end portion, and upon being trapped and killed, the animal will remain in the bag for disposal.

Swiss Patent No. CH643710 (Muller) discloses a trap having a baseboard and a cover which is hinged with one edge on the baseboard. A hinged strut supports the cover in a raised position and is pulled aside by a trip cord linked to a platform, the top end of which holds bait. Trapped animals are removed via a sack fitted to a release port.

German Patent No. DE2916239 (Gerlach) discloses a box trap for rat catching and has trailer boxes for removing a rat caught in the trap without danger to a user. The trap has two hinged trap doors, which are held by a movable linkage in an opened position. Once a rat is in the box trap, the trap doors cannot be pushed up from inside. The rat is driven into the trailer box, which can be removed and dropped into water, so that the rat can be drowned.

U.S. Pat. No. 5,224,287 (Knudsen) discloses a rat trap which includes a detector, as well as a power driven executing member for performance of successive operations after an automatic removal of previously executed rats. A built in energy source is provided in the trap for enabling activation of the executing member many times.

U.S. Pat. No. 4,356,655 (Morante et al) discloses an animal trap for trapping and disposal of small animals, such as rodents. The trap has a one way entrance actuated by a treadle adjacent an inaccessible source of food and a ladder leading to a one way chute, which is connected to a source of disposal, such as water.

U.S. Pat. No. 5,481,824 (Fiore, Jr.) discloses a tunnel type mouse trap, which is intended for disposal, having a central trapping mechanism powered by a rubber band. The rubber band urges a striker plate upwardly, and the trap is set by pushing down on the striker plate to engage a pivotal trigger carried by an anchor plate. When a mouse enters the tunnel and dislodges the trigger, the striker plate springs upwardly under the force of the rubber band and traps the mouse's neck in one of the trapping apertures.

For the foregoing reasons, there is a need for a mouse and rat trap that can be used to trap and rapidly kill at least one mouse, rat, rodent, and the like in a humane way, that can be used multiple times in heavily infested areas, is inexpensive, easy to operate, durable, and that allows for sanitary disposal of a plurality of the trapped and dead mice, rats, rodents, and the like without contact to humans who are required to dispose of the dead mice, rats, rodents, and the like.

SUMMARY OF THE INVENTION

The present invention is directed to a mouse and rat trap that can be used to trap and rapidly kill at least one mouse, rat, rodent, and the like in a humane way, that can be used multiple times in heavily infested areas, is inexpensive, easy to operate, durable, and that allows for sanitary disposal of a plurality of the trapped and dead mice, rats, rodents, and the like without contact to humans who are required to dispose of the dead mice, rats, rodents, and the like.

A mouse and rat trap having features of the present invention comprises: a housing having at least one entrance for at least one mouse, rat, rodent, and the like to enter the mouse and rat trap therethrough; bait means for attracting the at least one mouse, rat, rodent, and the like to the mouse and rat trap and entering the mouse and rat trap; an activation sensor for detecting presence of the at least one mouse, rat, rodent, and the like having entered the mouse and rat trap; a moveable partition within the housing for pushing the at least one mouse, rat, rodent, and the like, having entered the mouse and rat trap, past the at least one entrance and entrapping the mouse, rat, rodent, and the like within the mouse and rat trap; further the activation sensor for signalling the moveable partition drive means to commence driving the moveable partition from a resting starting position and for the moveable partition to commence pushing the at least one mouse, rat, rodent, and the like; an electrocution platform within the housing for at least stunning the at least one mouse, rat, rodent, and the like, the electrocution platform receiving power from a power source; further the moveable partition for pushing the at least one mouse, rat, rodent, and the like to the electrocution platform for at least stunning the at least one mouse, rat, rodent, and the like; means for reversably and movably driving the moveable partition; further the moveable partition for pushing the at least one mouse, rat, rodent, and the like into a holding container for removal and disposal of the at least one mouse, rat, rodent, and the like; and an activation switch for signalling the moveable partition drive means to reverse drive motion and movably drive the moveable partition in reverse to the resting starting position.

BRIEF DESCRIPTION OF THE DRAWINGS

These and other features, aspects, and advantages of the present invention will become better understood with regard to the following description, appended claims, and accompanying drawings where:

FIG. 4 is a perspective view of an electrocution platform of the mouse and rat trap of the present invention along lines 4—4 in FIG. 1;

FIG. 5 is a top view of the electrocution platform along lines of 6—6 FIG. 4; and FIG. 6 is a side section view of the electrocution platform of FIG. 5.

DESCRIPTION OF THE PREFERRED EMBODIMENTS

The preferred embodiments of the present invention will be described with reference to FIGS. 1–6 of the drawings. Identical elements in the various figures are identified with the same reference numbers.

Figure 1:
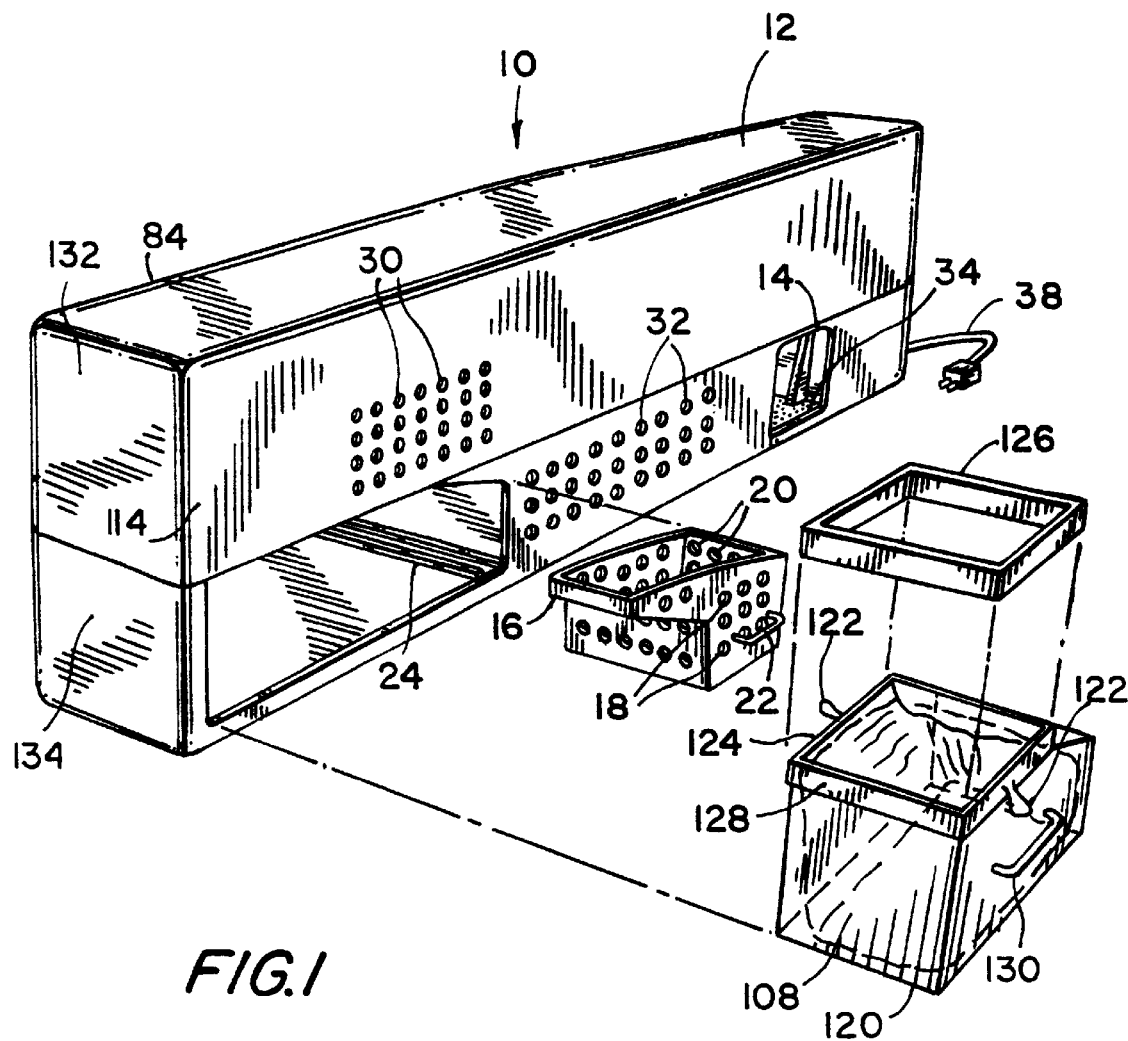
FIG. 1 is a perspective view of a mouse and rat trap, constructed in accordance with the present invention, with removable bait container and removable mouse and rat holding container having a disposable bag shown removed from the mouse and rat trap.
Figure 2:
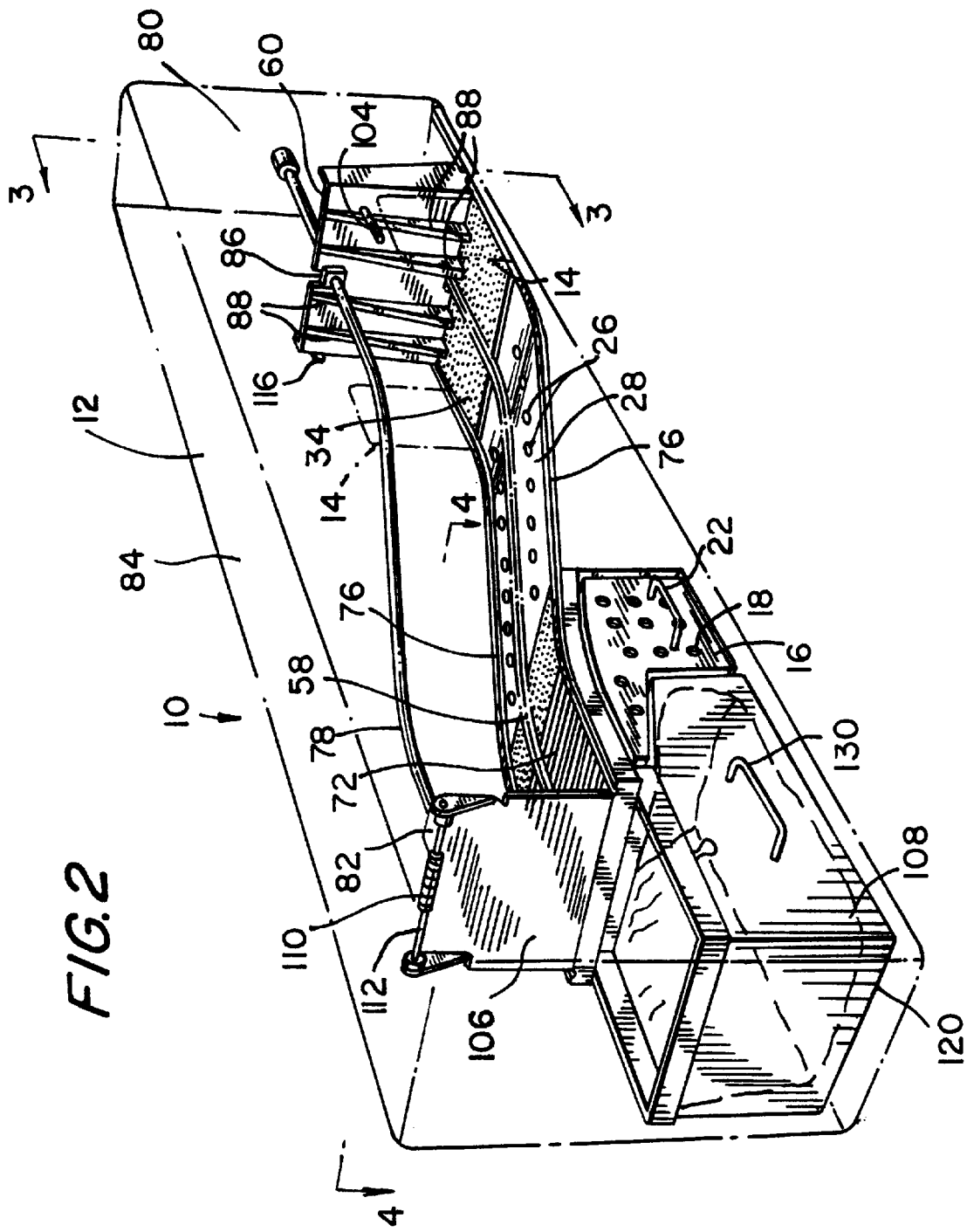
FIG. 2 is a perspective view of the interior of the mouse and rat trap of the present invention shown in FIG. 1.
Figure 3:
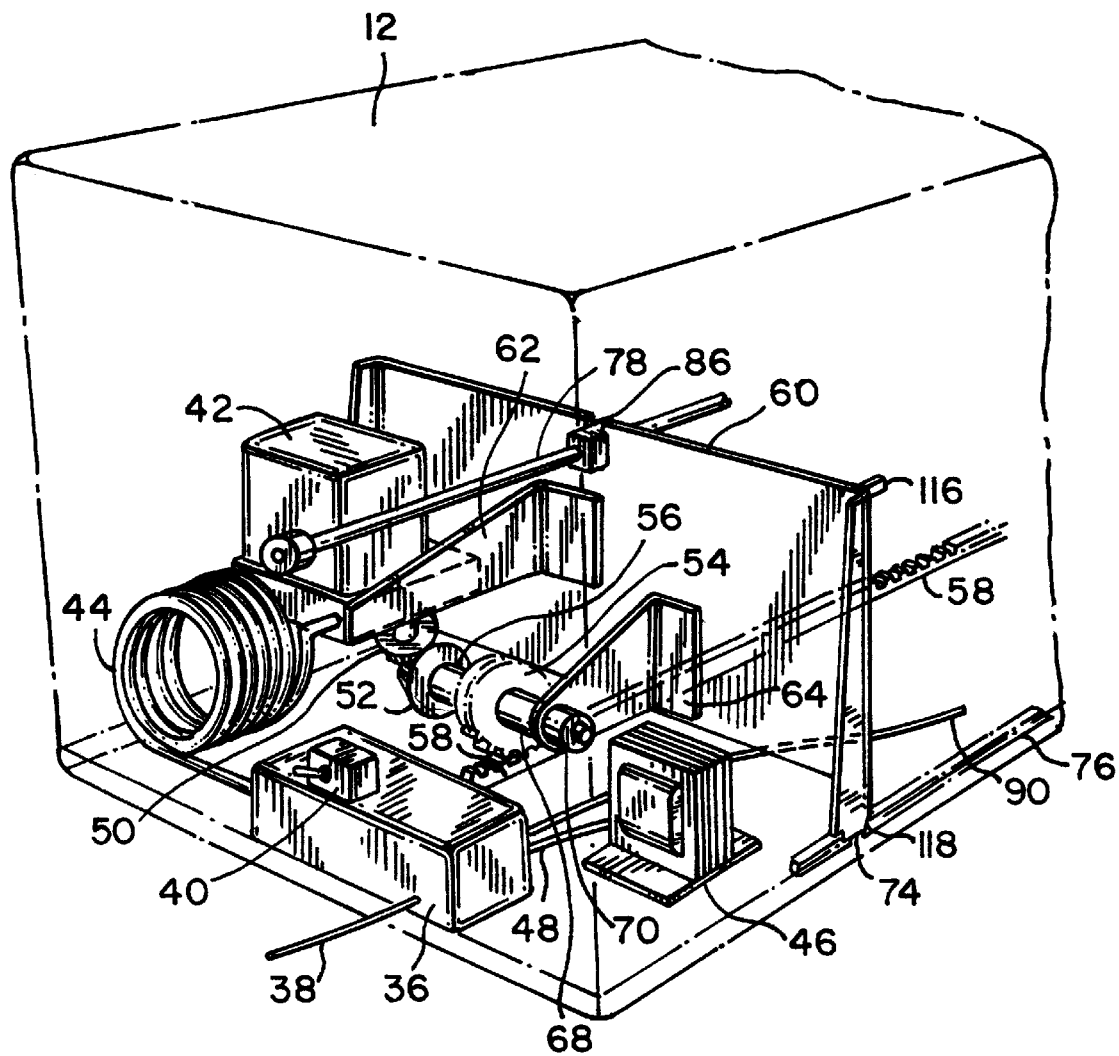
FIG. 3 is a perspective view of a drive assembly, controller, and power supply of the mouse and rat trap of the present invention along lines 3—3 in FIG. 1.

FIGS. 1 and 2 show an embodiment of the present invention, a mouse and rat trap 10, constructed in accordance with the present invention. The mouse and rat trap 10 has a substantially rectangular housing 12, having entrances 14 for mice and rats to enter.

Mice and rats are attracted to the mouse and rat trap 10 by a scent given off by bait (not shown) placed in a removable bait container 16, located in the base of the housing 12. The bait container 16 has vents 18 and 20 for the scent to escape to the exterior vicinity and interior of the mouse and rat trap 10, respectively. Different subspecies of rats and mice may be attracted to different bait and freshness of the bait. A user may change or replace the bait in the bait container 16, depending upon freshness, availability, and type of bait that the user may wish to use for attracting different subspecies of mice and rats to the mouse and rat trap 10. A handle 22 is adjoined to the bait container 16 for ease of insertion and removal of the bait container 16 into and out of the mouse and rat trap 10 by the user. The housing 12 also has a guide rail 24 for ease of guiding the bait container 16 into and out of the mouse and rat trap 10. Vents 26 are provided on inclined floor 28, so that the scent escaping from the bait container 16 through the vents 20 may enter into and permeate the interior of the mouse and rat trap 10. Vents 30 and 32 are also provided on the housing 12, so that a portion of the scent escaping through the floor vents 26 and a portion of the scent escaping from the bait container 16 through the bait container vents 20 may escape the mouse and rat trap 10 and attract mice and rats to the mouse and rat trap 10, respectively.

A sensor platform 34 is located adjacent the entrances 14 for sensing the presence of a mouse or rat having entered the mouse and rat trap 10. The weight of the mouse or the rat on the sensor platform 34 depress the sensor platform 34, which triggers a contact switch (not shown) located beneath the sensor platform 34. Body capacitance or optical sensors may also be used to detect the presence of the mouse or rat within the mouse and rat trap 10. A signal is sent to controller 36, shown in FIG. 3, from the contact switch that the mouse or rat has entered the mouse and rat trap 10.

The controller 36 may be powered by an alternating current (a.c.) power source via power cord 38 or alternatively by a battery. An optional power switch 40 is provided to turn power to the mouse and rat trap 10 on or off for the user's convenience. 110 volt or 220 volt alternating current may be provided to the mouse and rat trap 10. Power is supplied from the controller 36 to reversible gear reduction motor 42 via recoilable flexible power cord 44 and to power transformer 46 via power cord 48. A chopper power supply (not shown) or other suitable direct current to alternating current (d.c. to a.c.) converter is incorporated into the controller 36 for providing alternating current to the power transformer 46 and to the reversible gear reduction motor 42. A suitable direct current (d.c.) reversible gear reduction motor may alternatively be used. The controller 36 also controls sequence, energy consumption, and timing of power delivered to the reversible gear reduction motor 42 and the power transformer 46 and speed control of the reversible gear reduction motor 42.

Power is supplied from the controller 36 to the reversible gear reduction motor 42 and the power transformer 46 upon receipt of the signal from the controller 36 that the mouse or rat has entered the mouse and rat trap 10.

An output bevel gear 50 of the reversible gear reduction motor 42 drives a bevel gear 52 adjoined to pinion gear 54 by drive shaft 56. The output of the pinion gear 54, which is driven by the bevel gear 52 via the drive shaft 56, is applied to rack gear 58. The rack and pinion gears 58 and 54, respectively, are used to convert rotary motion from the pinion gear 54 to linear motion relative to the rack gear 58. The pinion gear 54 rides on the rack gear 58 and drives moveable partition 60, so that the moveable partition 60 travels along the rack gear 58, as output of the pinion gear 54 is applied to the rack gear 58.

The reversible gear reduction motor 42 and the drive shaft 56 are supported by brackets 62 and 64 adjoined to the moveable partition 60, respectively, and travel with the moveable partition 60. The controller 36 and the power transformer 46 remain in a fixed position and are mounted on floor 66. Press fit bushings 68 and 70 retain the drive shaft 56 on the bracket 64. The recoilable flexible power cord 44 provides power from the controller 36 to the reversible gear reduction motor 42 as the moveable partition travels along the rack 58.

The moveable partition 60 travels along the rack 58 and pushes the rat or mouse over the sensor platform 34, past the entrances 14, and along the inclined floor 28 to electrocution platform 72, shown in FIGS. 4–6. The mouse or rat is entrapped within the mouse and rat trap 10 upon having been pushed past the entrances 14.

The moveable partition 60 has tabs 74, which ride in guide grooves 76 for guiding the moveable partition 60 as the moveable partition 60 travels along the rack 58. A guide rod 78, is also used for guiding the moveable partition 60 as the moveable partition 60 travels along the rack 58. The guide rod 78 is adjoined to wall 80 and to a bracket 82, which is adjoined to wall 84 for supporting the guide rod 78. The moveable partition 60 has a bushing 86 affixed thereto for guiding the guide rod 78 therethrough. The guide grooves 76 and the guide rod 78 in combination guide the moveable partition 60 as the moveable partition travels along the rack 58. The moveable partition 60 also has reinforcing ribs 88 for structurally reinforcing the moveable partition 60 and to aid in prodding and pushing the mouse as the moveable partition 60 travels on the rack 58.

The mouse or rat is electrocuted upon reaching the electrocution platform 72. Power is supplied to the electrocution platform 72 from the power transformer 46 via cable 90. The power transformer 46 and/or the controller 36 may be used to change the voltage that the mouse or rat is subjected to for electrocution purposes, depending upon the needs of the user. The power transformer 46 and/or the controller 36 may be set to kill the mouse or rat, or alternatively to stun the mouse or rat. The electrocution platform 72 has two pluralities of interleaved parallel conductors 92 and 94, which are powered by the power transformer 46 via the cable 90 and conductors 96 and 98, respectively. Each of the pluralities of parallel conductors 92 and 94 are joined together at an opposing end to the other by the conductors 96 and 98, respectively. The conductors 96 and 98 are connected to the power transformer 46 via the cable 90. The interleaved parallel conductors 92 and 94 and the conductors 96 and 98 are insulated one from the other by insulator 100. Each of the interleaved parallel conductors 92 and 94 and the conductors 96 and 98 have prongs 102 mounted thereon and spaced at intervals for facilitating electrical contact with the legs and/or body of the mouse or rat and electrocuting the mouse or rat.

A push rod 104 is adjoined to the moveable partition 60. The push rod 104 pushes against and opens a one way spring loaded hanging hinged door 106, adjacent the electrocution platform 72, as the moveable partition 60 continues to travel along the rack 58, after the mouse or rat is electrocuted. As the one way spring loaded hanging hinged door 106 is opened, the mouse is pushed into disposable bag 108 by the moveable partition 60. The one way spring loaded hanging hinged door 106 is spring loaded by spring 110 on rod 112, which is mounted between walls 84 and 114. A tab 116, adjoined to the moveable partition 60, activates a switch (not shown) mounted on the wall 84, which signals the controller 36 to reverse the direction of the reversible gear reduction motor 42 after the mouse or rat is pushed into the disposable bag 108. The direction of travel of the moveable partition 60 is reversed when the direction of the reversible gear reduction motor 42 is reversed by the controller 36. The moveable partition 60 then moves back to starting position 118 adjacent the entrances 14, clearing the entrances 14 for another mouse or rat to enter the mouse and rat trap 10. The controller 36 removes power from the reversible gear reduction motor 42 and the electrocution platform 72 upon return of the moveable partition 60 to the starting position 118.

Once the one way spring loaded hanging hinged door 106 is closed, the one way spring loaded hanging hinged door 106 prevents the mouse or rat from voluntarily moving back onto the electrocution platform 72, even if the mouse or rat is only stunned and not completely dead when the mouse is pushed into the disposable bag 108. The disposable bag 108 is contained in removable mouse and rat holding container 120, is large enough to collect a plurality of dead rats and mice, and has pull strings 122 to close the disposable bag 108 for sanitary disposal of the dead rats and mice without contact to the user. The disposable bag 108 is folded over and supported by top edge 124 of the removable mouse and rat holding container 120 and is fastened in place by bag retainer frame 126, which fits over the top edge 124 and clamps the top 128 of the disposable bag 108 therebetween. The disposable bag 108 is of PVC or other suitable material that is preferably biodegradable, for sanitary disposal of the dead rats and mice. The dead rats and mice may be collected alternatively in the removable mouse and rat holding container 120 without the use of the disposable bag 108, if the user wishes to risk less sanitary conditions for disposal of the dead rats and mice. A handle 130 is adjoined to the removable mouse and rat holding container 120 for ease of insertion and removal of the removable mouse and rat holding container 120 into and out of the mouse and rat trap 10 by the user.

The housing 12 is constructed preferably with a removably fastened top 132 and bottom 134 to facilitate easy access to the interior of the mouse and rat trap 10 for easy maintenance. The housing 12 may be constructed of aluminum, steel, PVC or other suitable material and may be of molded construction.

The mouse and rat trap 10 is suitable for trapping and killing mice, rats, other rodents, and like animals and pests.

Although the present invention has been described in considerable detail with reference to certain preferred versions thereof, other versions are possible. Therefore, the spirit and scope of the appended claims should not be limited to the description of the preferred versions contained herein.

What is claimed is:

1. A trap comprising:
    a housing having at least one entrance for a rodent to enter said trap therethrough;
    a removable bait container, said removable bait container having vents for releasing a scent in the vicinity of said trap for attracting said rodent to said trap and entering said trap;
    an activation sensor for detecting presence of said rodent having entered said trap;
    a moveable partition within said housing for pushing said rodent having entered said trap, past said at least one entrance and entrapping said rodent within said trap;
    further said activation sensor arranged for signalling moveable partition drive means to commence driving said moveable partition from a resting starting position and for said moveable partition to commence pushing said rodent;
    an electrocution platform within said housing, said electrocution platform receiving power from a power source;
    further said moveable partition arranged for pushing said rodent to said electrocution platform;
    motorized means for reversibly and movably driving said moveable partition;
    further said moveable partition arranged for pushing said rodent through a one way door into a removable holding container for removal and disposal of said rodent;
    further said one way door arranged for separating said electrocution platform from said holding container and for preventing said rodent from reentering onto said electrocution platform from said removable holding container; and
    at activation switch for signalling said moveable partition drive means to reverse drive motion and movably drive said moveable partition in reverse to said resting starting position.

2. The trap according to claim 1, wherein said holding container has a disposal bag therein for containing and sanitary disposal of said rodent.

3. The trap according to claim 1, wherein said motorized drive means further comprises:
    a reversible motor mounted on said moveable partition;
    a pinion gear rotatably mounted on said moveable partition;
    a rack gear mounted in said housing and contacting said pinion gear;
    said reversible motor for driving said pinion gear rotatably mounted on said moveable partition; and
    said pinion gear arranged for driving said moveable partition relative to said rack gear;
    wherein said pinion gear and said rack gear convert rotary motion from said reversible motor to linear motion of said moveable partition relative to said rack gear.

4. The trap according to claim 1, further comprising a controller for communicating and controlling signals from said activation sensor and said activation switch to said moveable partition drive means and controlling motion of said moveable partition.

5. The trap according to claim 6, wherein said electrocution platform interleaved parallel conductors have prongs mounted thereon and spaced at intervals for facilitating electrical contact with portions of said rodent and electrocuting said rodent.

6. The trap according to claim 1, wherein said power source is an alternating current power source.

7. The trap according to claim 6, further comprising a controller arranged for receiving power from said alternating current power source for regulating voltage to said electrocution platform.

8. The trap according to claim 1, wherein said electrocution platform comprises two sets of parallel conductors which are interleaved and insulated from each other and connected to opposing voltage sides of a power source.

9. The trap according to claim 1, wherein said removable bait container and said removable holding container have handles to facilitate removal of said removable bait container and said removable holding container from said trap.

10. The trap according to claim 1, further comprising guides for guiding said moveable partition within said trap.

11. The trap according to claim 1, wherein said electrocution platform is elevated above said removable holding container.

12. A trap, comprising:
    a housing having at least one entrance for a rodent to enter said trap therethrough;
    bait means for attracting said rodent to said trap and entering said trap;
    an activation sensor for detecting presence of said rodent having entered said trap;
    a moveable partition within said housing for pushing said rodent have entered said trap, past said at least one entrance and entrapping said rodent within said trap;
    further said activation sensor arranged for signalling moveable partition drive means to commence driving said moveable partition from a resting starting position and for said moveable partition to commence pushing said rodent;
    an electrocution platform within said housing, said electrocution platform receiving power from a power source;
    further said moveable partition arranged for pushing said rodent to said electrocution platform;

means for reversibly and movably driving said moveable partition;

further said moveable partition arranged for pushing said rodent into a holding container for removal and disposal of said rodent; and an activation switch for signalling said moveable partition drive means to reverse drive motion and movably drive said moveable partition in reverse to said resting starting position.

13. The trap according to claim 12, wherein said holding container has a disposable bag therein for containing and sanitary disposal of said rodent.

14. The trap according to claim 12, wherein said bait means comprises a removable bait container, said removable bait container having vents for releasing a scent in the vicinity of said trap for attracting said rodent to said trap and entering said trap.

15. The trap according to claim 12, wherein said holding container is a removable holding container for removal and disposal of said rodent.

16. The trap according to claim 12, wherein said drive means is motorized.

17. The trap according to claim 12, wherein said drive means is hydraulic.

18. The trap according to claim 12, wherein said drive means is pneumatic.

19. The trap according to claim 12, wherein said drive means further comprises:

a reversible motor mounted on said moveable partition;

a pinion gear rotatably mounted on said moveable partition;

a rack gear mounted in said housing and contacting said pinion gear;

said reversible motor for driving said pinion gear rotatably mounted on said moveable partition; and said pinion gear arranged for driving said moveable partition relative to said rack gear;

wherein said pinion gear and said rack gear convert rotary motion from said reversible motor to linear motion of said moveable partition relative to said rack gear.

20. The trap according to claim 12, further comprising a controller for communicating and controlling signals from said activation sensor and said activation switch to said moveable partition drive means and controlling motion of said moveable partition.

21. The trap according to claim 10, wherein said electrocution platform interleaved parallel conductors have prongs mounted thereon and spaced at intervals for facilitating electrical contact with portions of said rodent and electrocuting said rodent.

22. The trap according to claim 12, wherein said power source is an alternating current power source.

23. The trap according to claim 12, further comprising a controller receiving power from said alternating current power source for regulating voltage to said electrocution platform.

24. The trap according to claim 12, wherein said electrocution platform comprises two sets of parallel conductors which are interleaved and insulated from each other and connected to opposing voltage sides of a power source.

* * * * *